United States Patent
Rose

[11] 3,890,727
[45] June 24, 1975

[54] ROTARY CARD FILE

[75] Inventor: Lloyd E. Rose, North Smithfield, R.I.

[73] Assignee: Textron Inc., Providence, R.I.

[22] Filed: Aug. 23, 1973

[21] Appl. No.: 390,702

[52] U.S. Cl. ............................................ 40/68.6
[51] Int. Cl. ......................................... G09f 11/02
[58] Field of Search .............. 40/68.6, 73.2, 68, 72; 211/58; 312/328

[56] References Cited
UNITED STATES PATENTS

| | | | |
|---|---|---|---|
| 1,558,376 | 10/1925 | Lewis et al. | 40/68.6 |
| 2,703,744 | 3/1955 | Karper | 40/68.6 X |
| 2,731,017 | 1/1956 | Neilsen | 40/68.6 |
| 3,279,470 | 10/1966 | Neilsen | 40/74 X |
| 3,333,356 | 8/1967 | Bosland | 40/68 |
| 3,628,269 | 12/1971 | Dahl, Jr. | 40/68.6 |

Primary Examiner—Robert W. Michell
Assistant Examiner—John H. Wolff
Attorney, Agent, or Firm—Cushman, Darby & Cushman

[57] ABSTRACT

A rotary card file comprising a base structure including a pair of horizontally spaced vertically extending support elements having horizontally aligned openings therein defining rotary spindle supporting surfaces and inwardly and outwardly facing annular spindle control surfaces adjacent the spindle supporting surfaces, a card supporting spindle structure having annular spindle control surfaces on the ends thereof for engaging the inwardly facing spindle control surfaces of the support elements, a pair of turning knob members having annular spindle control surfaces on the inner ends thereof for engaging the outwardly facing spindle control surfaces of the support elements and shaft sections extending inwardly through the support element openings in supported relation with respect to the spindle supporting surfaces thereof into recesses within the end portions of the spindle structure, interengaging surfaces between the shaft sections and recesses for permitting relative axial movement between the knob members and spindle structure but preventing relative rotational movement between the knob members and spindle structure when the shaft sections are disposed within the recesses, and a spring carrying pin extending axially through the spindle structure and connected between the knob members for resiliently urging the latter axially toward each other and hence the interengaging spindle control surfaces into frictional contact to thereby control the rotational movement of the card carrying spindle structure.

13 Claims, 8 Drawing Figures

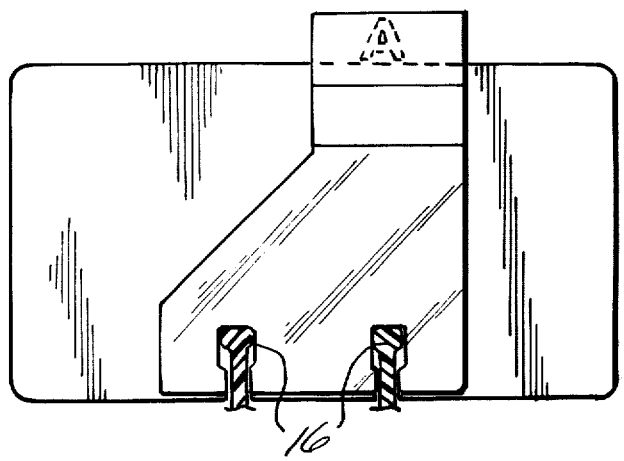
Fig. 5
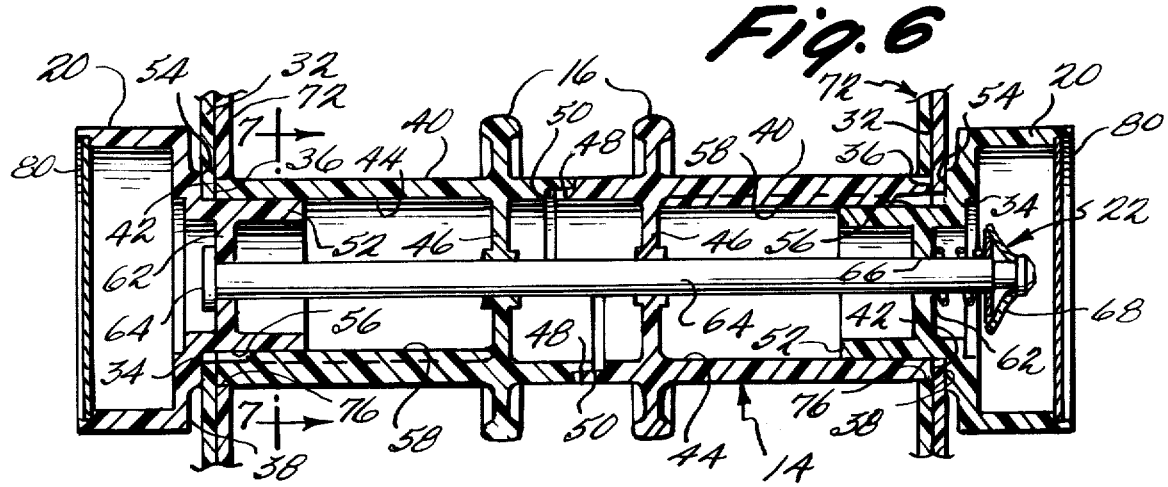
Fig. 6
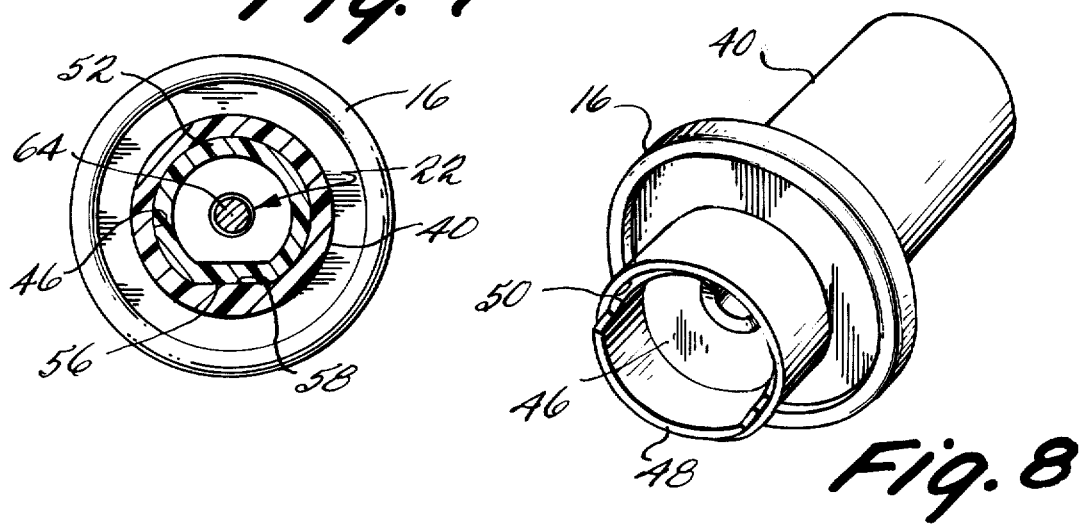
Fig. 7
Fig. 8

ROTARY CARD FILE

This invention relates to card files and more particularly to card files of the rotary type.

Card files of the rotary type are well known and have been in commercial use for many years. In general, known devices comprise essentially a base adapted to engage a desk top or other horizontal surface and to rotatably support a rotary spindle. The spindle is provided with a pair of parallel peripheral rails and the cards are provided with a corresponding pair of T-shaped openings along their lower edges within which the rails are received for the purpose of releasably retaining the cards on the spindle in generaly articulated relation so that by rotating the spindle, visual access to any desired one of the cards is quickly and readily obtained. Various arrangements have been provided for controlling the rotational movement of the card carrying spindle on the base so that a desired balance between ease of effecting movement and stability when at rest is obtained. In general, these arrangements have involved the utilization of one-way clutches and the like. While there have been proposals in the patented literature (see, for example, U.S. Pat. No. 2,479,167) to utilize spring pressure to control the rotation of the card-carrying spindle, such arrangements have not been adopted to any extent commercially.

An object of the present invention is to provide a rotary card file of the type described in which the rotational movement of the card-carrying spindle is controlled by spring pressure through the interengagement of improved control surfaces which provide for a desired balance between ease of turning and stability at rest.

Another object of the present invention is the provision of a rotary card file of the type described which is particularly suited to be assembled of molded plastic components of simple economical construction which are easily and quickly assembled and retained in their assembled relation by the spring pressure controlling the rotational movement of the card-carrying spindle.

Another object of the present invention is the provision of a rotary card file of the type described which is of simple, sturdy construction, which is easy to assemble and hence economical to manufacture, while at the same time being capable of efficient operation over an extended period of use.

These and other objects of the present invention will become more apparent during the course of the following detailed description and appended claims.

The invention may best be understood with reference to the accompanying drawings wherein an illustrative embodiment is shown.

In the drawings:

FIG. 5 is a fragmentary sectional view taken along the line 5—5 of FIG. 4;

FIG. 6 is a fragmentary sectional view taken along the line 6—6 of FIG. 4;

FIG. 7 is a sectional view taken along the line 7—7 of FIG. 6; and

FIG. 8 is a perspective view of one of the molded bodies of the spindle structure.

Figure 1:
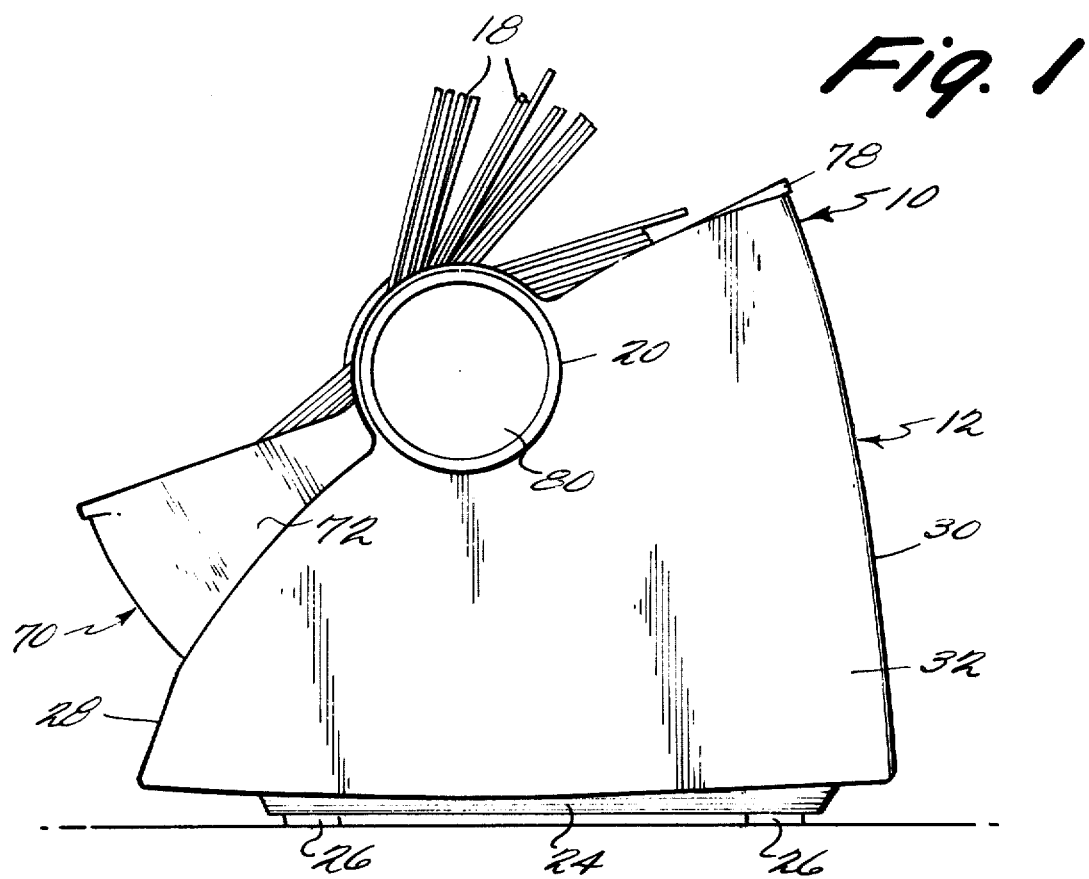
FIG. 1 is a side elevational view of a rotary card file embodying the principles of the present invention.
Figure 2:
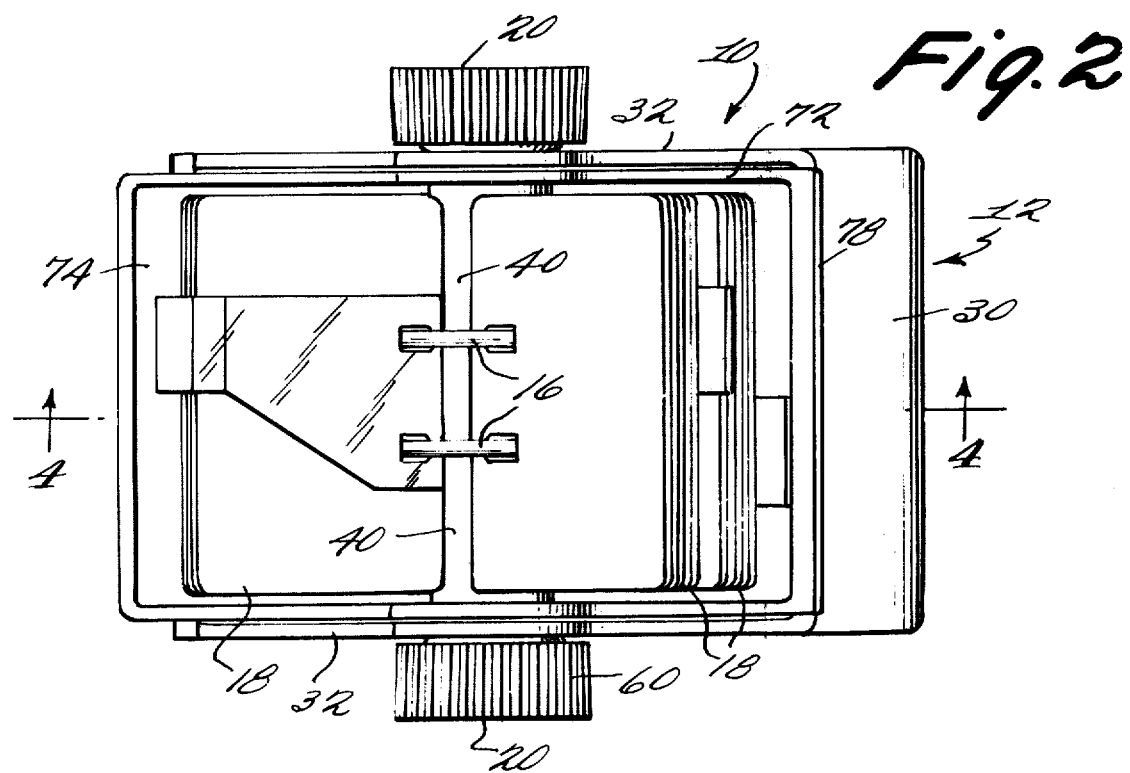
FIG. 2 is a top plan view of the rotary card file shown in FIG. 1.
Figure 3:
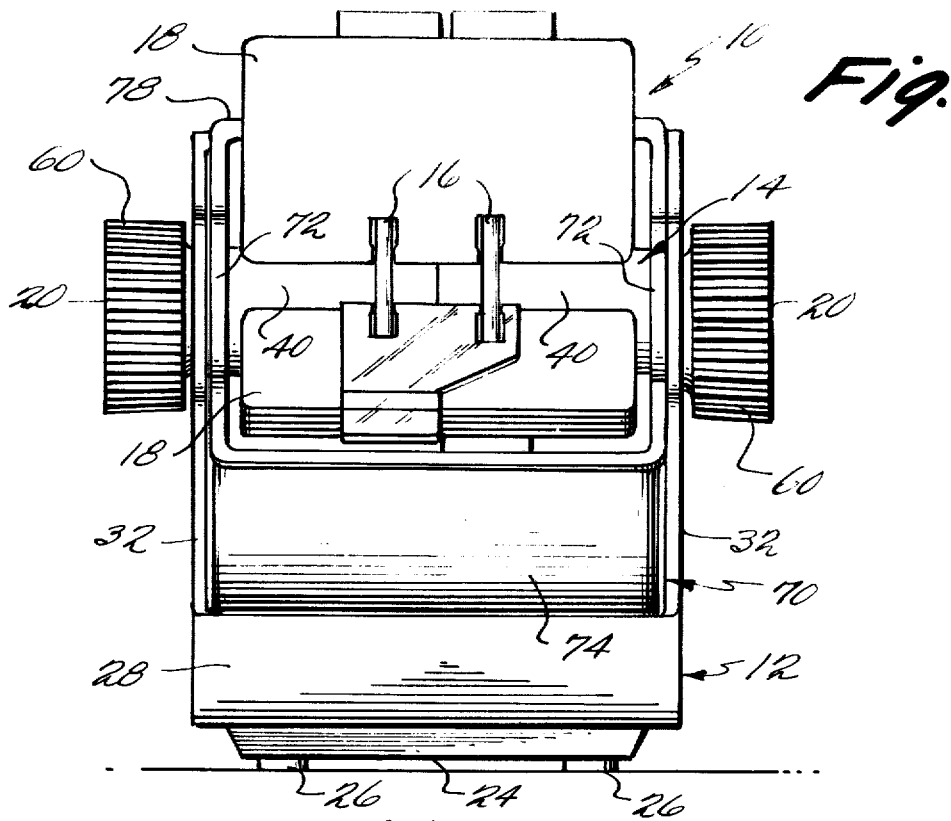
FIG. 3 is a front elevational view of the rotary card file.

Referring now more particularly to the drawings, there is shown therein a rotary card file, generally indicated at 10, which embodies the principles of the present invention. The rotary card file 10 comprises, in general, a base structure, generally indicated at 12, which is arranged to be supported on a desk top or other horizontal surface, a spindle structure, generally indicated at 14, having a pair of parallel peripheral rails 16 for releasably receiving a plurality of cards 18 in articulated relation about the periphery of the spindle structure, a pair of knob members 20 which serve to rotatably support the spindle structure 14 on the base structure 12 and provide means for enabling an operator to effect such turning movement, and a spring assembly 22 which serves to retain the above component parts in assembled relation and to provide a spring pressure for controlling the rotational movement of the spindle structure with respect to the base structure.

The base structure 12 may assume any desired configuration, the preferred embodiment shown in the drawings being in the form of an open top housing molded of plastic material. The plastic material may be of any known type, a preferred embodiment being polystyrene. In the open top housing form shown, the base structure includes a bottom wall 24 having a series of desk top engaging pads 26 on the under surface thereof. Extending upwardly from the periphery of the bottom wall is a relatively low front wall 28, a relatively high rear wall 30 and two side walls 32. The side walls 32 constitute horizontally spaced support elements and have horizontally aligned circular openings 34 formed therein which define spindle supporting surfaces. As best shown in FIG. 6, the portion of the end walls 32 surrounding the openings 34 is of generally flat cross-sectional configuration and provides opposed inwardly and outwardly facing spindle control surfaces 36 and 38 respectively which are of flat annular configuration disposed within planes extending perpendicular to the aligned axis of the openings 34.

The spindle structure 14 is preferably formed of two substantially identically shaped annular bodies 40 molded of a plastic material. Here again, any of the well-known plastic materials may be utilized, a preferred material being polystyrene. As best shown in FIGS. 6 and 8, each body 40 is of generally hollow tubular form having one of the annular rails 16 formed integrally on the exterior periphery thereof at an offset position between the ends thereof. The longer end portion of each body 40 has an end spindle control surface 42 which is of flat annular configuration to engage with an associated spindle control surface 36. The interior of the longer end portion of each body 40 defines a recess 44 which extends inwardly of the end surface 42. The inner end of the recess 44 is defined by a centrally apertured interior wall portion 46 which is generally longitudinally aligned with the associated rail 16.

Formed on the end of each body 40 opposite from the end surface 42 are complementary projecting and recessed portions which are interengageable axially with recessed and projecting portions respectively of the other body to prevent relative rotary and radial movement between the bodies when the projecting and recessed portions are interengaged. As shown, each projecting portion is in the form of a generally semi-cylindrical projection 48 extending axially outwardly of the body end along the interior of the tubular body. Each recessed portion is in the form of a generally semi-cylindrical recess 50 extending axially inwardly of the body along the interior thereof. It will be understood that with this construction, the two bodies 40 can be positioned in interengaged relation as shown in FIG. 6, by disposing the ends having the projections 48 and recess 50 toward each other and rotationally displacing them with respect to each other until the projection 48 of each is aligned with the recess 50 of the other and then effecting an axial movement of the bodies toward one another until each projection 48 engages within the recess 50 of the other body.

The knob members 20 are of substantially identical configuration, preferably molded of plastic material with integral hollow shaft sections 52 extending from one end thereof. The shaft section 52 of each knob member 20 has an exterior periphery of a size to extend through an opening 34 in an associated end wall 32 and into a recess 44 of an associated spindle body 40. Formed on each knob member 20 at a position radially outwardly of the outward extension of the integral shaft section 52 therof is an annular generally flat spindle control surface 54 for engaging an associated control surface 38 of the base structure.

In order to permit each shaft section 52 to be engaged axially within its associated recess 44 and to prevent relative rotational movement between each knob member 20 and spindle body 40 when so engaged, interengaging means are formed in the interior surface of each recess and the exterior surface of each shaft section. In the preferred embodiment shown, this interengaging means is in the form of a chordal surface 56 on the generally cylindrical exterior of each shaft section and a corresponding chordal surface 58 on the generally cylindrical interior of each recess 44.

Each knob member 20 has its exterior periphery formed with a gripping surface 60 to facilitate manual turning thereof, the knob member being of generally outwardly opening cup-shaped configuration. As before, any of the well-known plastic materials may be used in molding the knob members, a preferred material being polystyrene. Each knob member 20 also includes an integral centrally apertured interior wall portion 62, which, like the wall portions 46, cooperate with the spring assembly 22. As best shown in FIG. 6, the spring assembly 22 includes a metal pin 64 which extends axially through all of the apertured wall portions 62 and 46. The pin 64 has an integral head 65 on one end thereof which engages one wall portion 62. The opposite end portion of the pin extends through the opposite wall portion 62 and beyond so as to receive thereon a coil spring 66. The outer extremity of the pin is grooved to receive an annular push clip 68 which serves to engage the outer end of the coil spring to retain the inner end thereof in biased engagement with the associated knob wall portion 62.

It will be understood that the base structure 12 can be simply a generally U-shaped structure of any desired configuration, as for example, such as disclosed in Maruca et al. commonly-assigned design patent application Ser. No. D392,356 filed concurrently herewith. Where the open top housing form of base structure 12 is utilized, it is preferable to provide a cover structure, generally indicated at 70, in the drawings.

Figure 4:
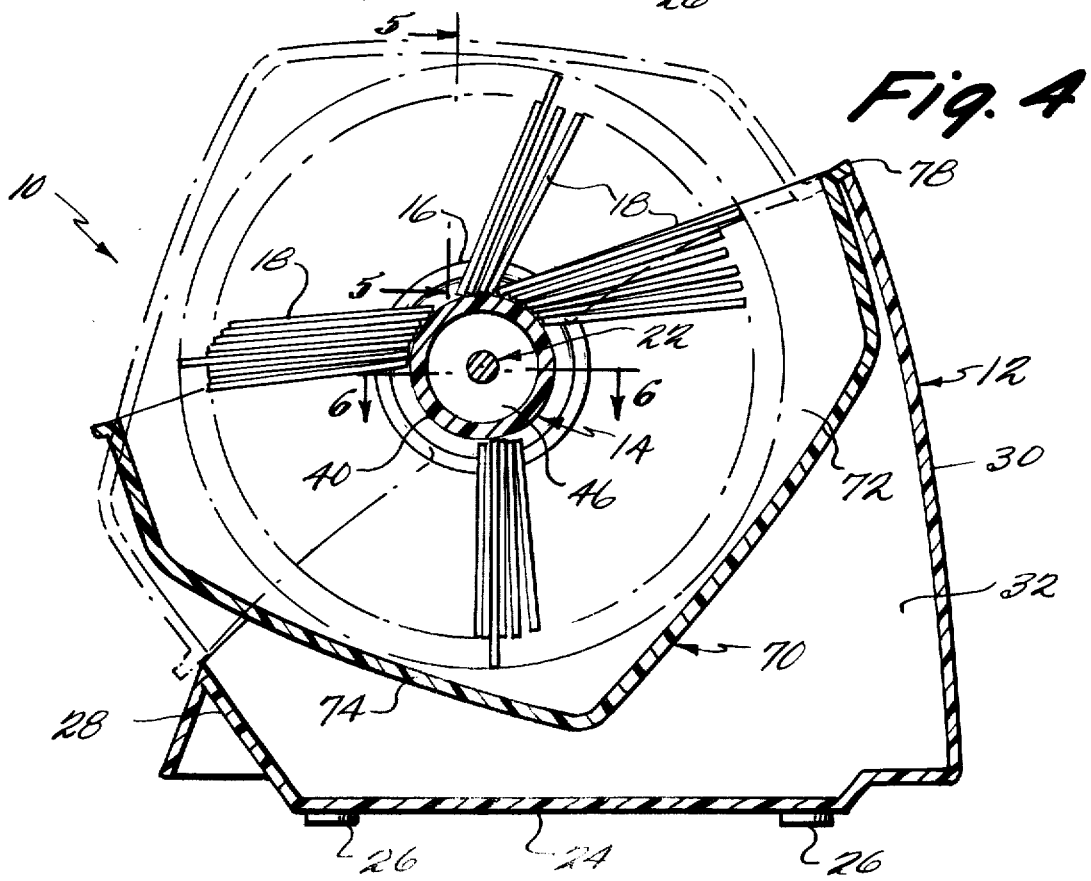
FIG. 4 is a sectional view taken along the line 4—4 of FIG. 2.

As best shown in FIGS. 1–4 of the drawings, the cover structure 70 is preferably molded of plastic material, similar to the base structure 12, to include a pair of end walls 72 of a configuration best shown in FIG. 4 and a partial peripheral wall 74 extending between portions of the edges thereof. The central portion of the free edges of the end walls includes arcuate projections and circular openings 76 are formed within these projections and the adjacent portion of the end walls. The openings 76 are of a size to engage over the substantially cylindrical exterior peripheries of the spindle bodies 40 at the ends thereof adjacent spindle control surfaces 42. This engagement of the end walls 72 on the spindle structure 14 thus serves to mount the cover structure 70 for pivotal movement between an open card access position, as shown in solid lines in FIG. 4, and a closed card enclosing position, as shown in dotted lines in FIG. 4. In order to limit the pivotal movement of the cover structure 70 between these two positions, the peripheral wall 72 has a flange 78 extending outwardly along at least one edge thereof. As shown in FIG. 4, the flange 78 engages the upper edge of the rear wall 30 of the base structure when the cover structure is in its open position, the distribution of the weight of the cover structure serving to maintain the same in such engagement. When the cover structure is in its closed position, flange 78 engages the upper edge of front wall 28 of the base structure, the distribution of the weight of the cover structure again serving to maintain the same in such engagement.

The preferred embodiment of the roatary card file 10 described above and shown in the drawings assembled by first engaging one of the spindle bodies 40 between the end walls 72 of the cover structure and then moving the control surface 42 end of the body through one of the openings 76 of one of the end walls. The other spindle body 40 is then moved between the one spindle body and the other end wall of the cover structure in end-to-end inverted relation with respect to the first spindle body 40. The second spindle body is moved axially outwardly through the other end wall opening 76 and then the two spindle bodies are brought together in proper rotational orientation so as to permit the projections 48 and recesses 50 to interengage by a relative axial movement, as aforesaid. Next, this assembly is placed between the end walls 32 of the base structure 12 so that the outwardly facing recesses 44 of the spindle structure are aligned with the openings 34 in the end walls 32. Next, the shaft sections 52 of the knob members 20 are inserted axially through the associated aligned openings 34 and recesses 44, the chordal surfaces 56 and 58 being appropriately aligned during this movement. Next, pin 64 is axially inserted through the apertured walls 62 and 46 of this assembly until the head 65 engages the initial wall 62. Next, the spring 66 is engaged over the outwardly extending end of the pin and the assembly is completed by engaging the push clip 68 over the extremity of the pin into engagement with the groove formed in the periphery thereof. It will be understood that cover disks 80 may be engaged within the open end of the knob members for appearance purposes if desired to complete the assembly.

It will be noted that the spring assembly 22 thus serves to resiliently bias the interengaging control surfaces 36, 38, 42 and 54 into frictional contact. This frictional contact serves to control the rotational movement of the spindle assembly after the cards 18 have been appropriately mounted on the rails 16. The force of the spring 66 is chosen so as to provide a desired balance between ease of turning and maintenance of the card carrying spindle structure in any position into which it is manually moved.

It will be understood that while the preferred embodiment of the present invention includes but a single spindle structure for receiving and supporting a single annular row of cards, it is within the contemplation of the present invention to mount a plurality of axially aligned spindle structures on a common base structure for receiving and supporting a plurality of annular rows of cards for rotation about a common axis.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A rotary card file comprising a base structure including a pair of horizontally spaced vertically extending suppport elements having horizontally aligned openings therein defining rotary spindle supporting surfaces, said support elements having inwardly and outwardly facing annular spindle control surfaces adjacent said spindle supporting surfaces, a card supporting spindle structure extending horizontally between said support elements having means thereon for supporting a series of cards in articulated relation about the periphery thereof, said spindle structure including annular spindle control surfaces on the ends thereof interengaging the inwardly facing spindle control surfaces of said support elements, a pair of turning knob members disposed outward of said support elements, said turning knob members including annular spindle control surfaces on the inner ends thereof interengaging the outwardly facing spindle control surfaces of said support elements and shaft sections extending inwardly through said support element openings in supported relation with respect to the spindle supporting surfaces thereof, said spindle structure having recesses within the end portions thereof receiving said shaft sections, interengaging means between said shaft section and said recesses for permitting relative axial movement between said knob members and said spindle structure but preventing relative rotational movement between said knob members and said spindle structure when said shaft sections are disposed within said recesses, and means extending axially through said spindle structure and connected between said knob members for resiliently urging the latter axially toward each other and hence the interengaging spindle control surfaces into engagement, said resilient urging means including spring means for provding a desired balance between ease of turning and maintenance of the card carrying spindle in any position into which it is manually moved.

2. A rotary card file as defined in claim 1 wherein said spindle structure comprises a pair of substantially identically shaped annular bodies molded of plastic material, each of said annular bodies including a hollow portion extending from one end thereof which defines an associated annular spindle control surface and an associated recess, and complementary projecting and recessed portions at the opposite end thereof interengageable axially with recessed and projecting portions respectively of the other body to prevent relative rotary and radial movement between said bodies when said projecting and recessed portions are interengaged.

3. A rotary card file as defined in claim 2 wherein each of said bodies also includes a radially outwardly extending annular cord engaging rail portion between the ends thereof, said rail portions constituting said card supporting means.

4. A rotary card file as defined in claim 3 wherein each of said bodies also includes a centrally apertured interior wall portion defining the inner end of the associated recess.

5. A rotary card file as defined in claim 4 wherein each knob member and associated shaft section are formed integrally of plastic material and have a configuration substantially identical to the other knob member and associated shaft section.

6. A rotary card file as defned in claim 5 wherein said interengaging means comprises substantially flat chordal surfaces formed in substantially cylindrical surfaces on the exterior and interior peripheries of said shaft sections and said recesses respectively.

7. A rotary card file as defined in claim 6 wherein all of said spindle control surfaces are of substantial flat annular configuration disposed in planes generally perpendicular to the rotational axis of said spindle structure.

8. A rotary card file as defined in claim 7, wherein said resilient urging means comprises an elongated pin extending axially through said knob members and spindle structure, said pin having a head on one end thereof for operatively engaging a wall of one of said knob members, the opposite end portion of said pin extending through and outwardly beyond a corresponding wall of the other knob member, a removable clip on the extremity of said pin end portion, and a coil spring surrounding said pin end portion and operatively engaged between said clip and the aforesaid corresponding wall of the other knob member.

9. A rotary card file as defined in claim 1 wherein each knob member and associated shaft section are formed integrally of plastic material and have a configuration substantially identical to the other knob member and associated shaft section.

10. A rotary card file as defined in claim 1 wherein sad interengaging means comprises substantially flat chordal surfaces formed in substantially cylindrical surfaces on the exterior and interior peripheries of said shaft sections and said recesses respectively.

11. A rotary card file as defined in claim 1 wherein all of said spindle control surfaces are of substantial flat annular configuration disposed in planes generally perpendicular to the rotational axis of said spindle structure.

12. A rotary card file as defined in claim 1, wherein said resilient urging means comprises an elongated pin extending axially through said knob members and spindle structure, said pin having a head on one end thereof for operatively engaging a wall of one of said knob members, the opposite end portion of said pin extending through and outwardly beyond a corresponding wall of the other knob member, a removable clip on the extremity of said pin end portion, and wherein said spring means comprises a coil spring surrounding said pin end portion and operatively engaged between said clip and the aforesaid corresponding wall of the other knob member.

13. A rotary card file as defined in claim 1 wherein said base structure is in the form of an open top housing, said spindle structure having a substantially cylindrical exterior periphery adjacent the ends thereof and a cover structure mounted on the cylindrical ends of said spindle structure for pivotal movement between a card access position within said housing and an enclosure position extending over the open top of said housing.

* * * * *